Dec. 14, 1926.                                                    1,610,358
                          R. E. CALLER
                      DUST COLLECTING SYSTEM
                      Filed Feb. 21, 1925            4 Sheets-Sheet 1
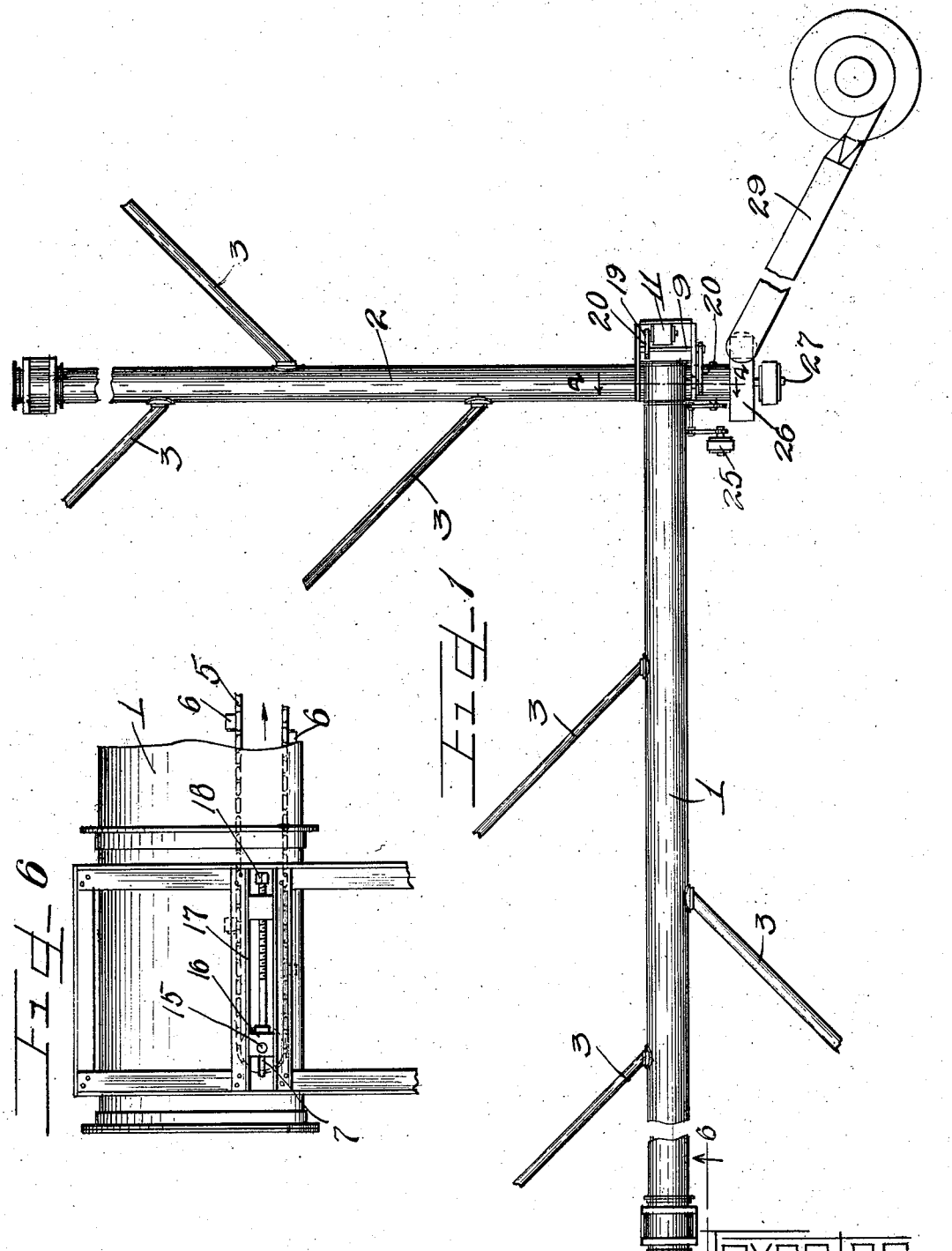

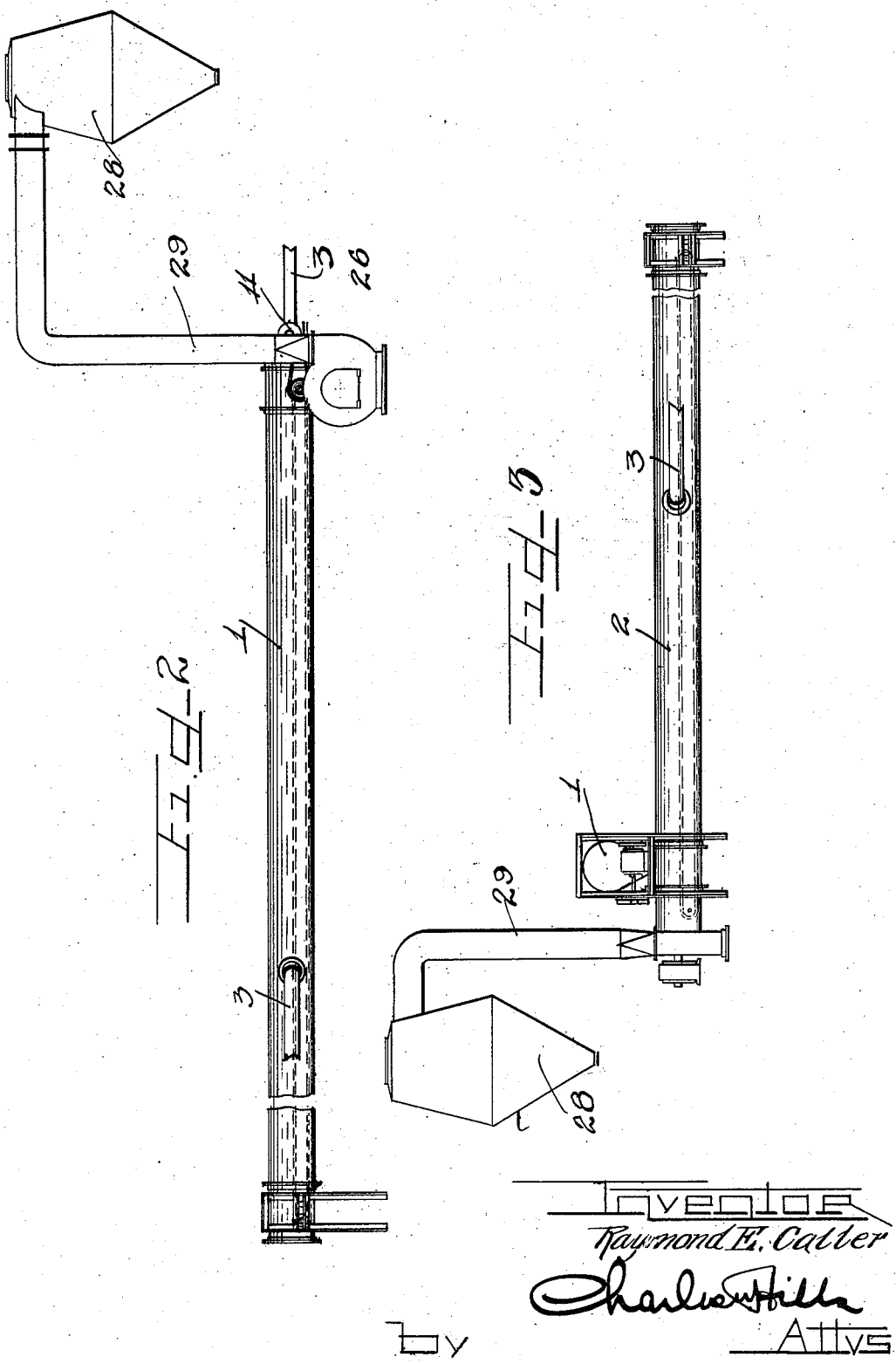

Dec. 14, 1926. 1,610,358
R. E. CALLER
DUST COLLECTING SYSTEM
Filed Feb. 21, 1925 4 Sheets-Sheet 3
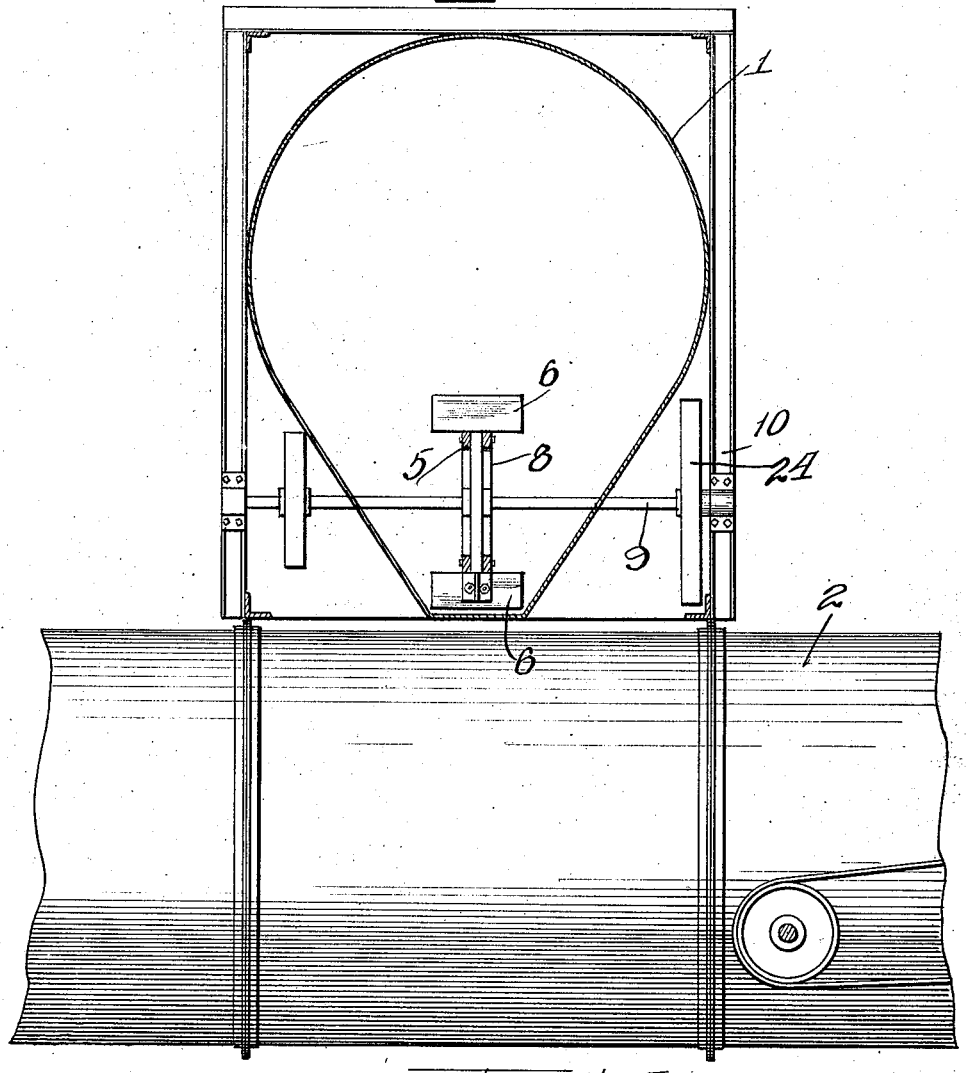
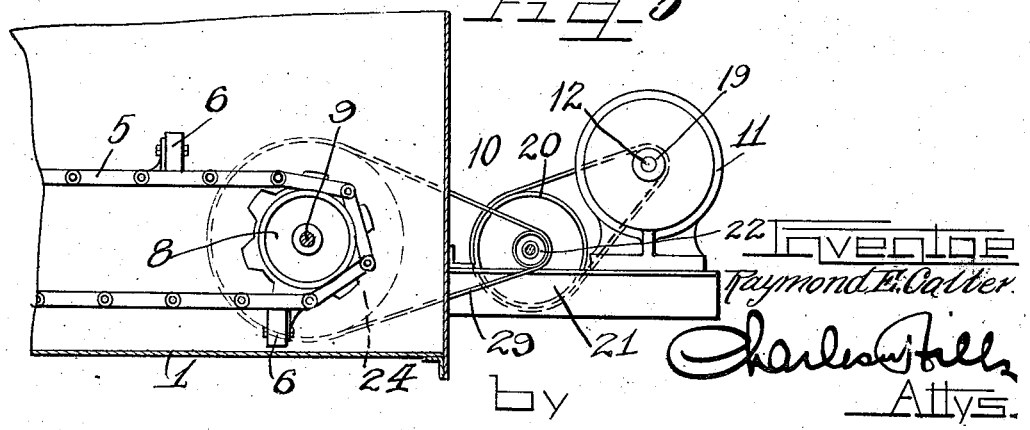

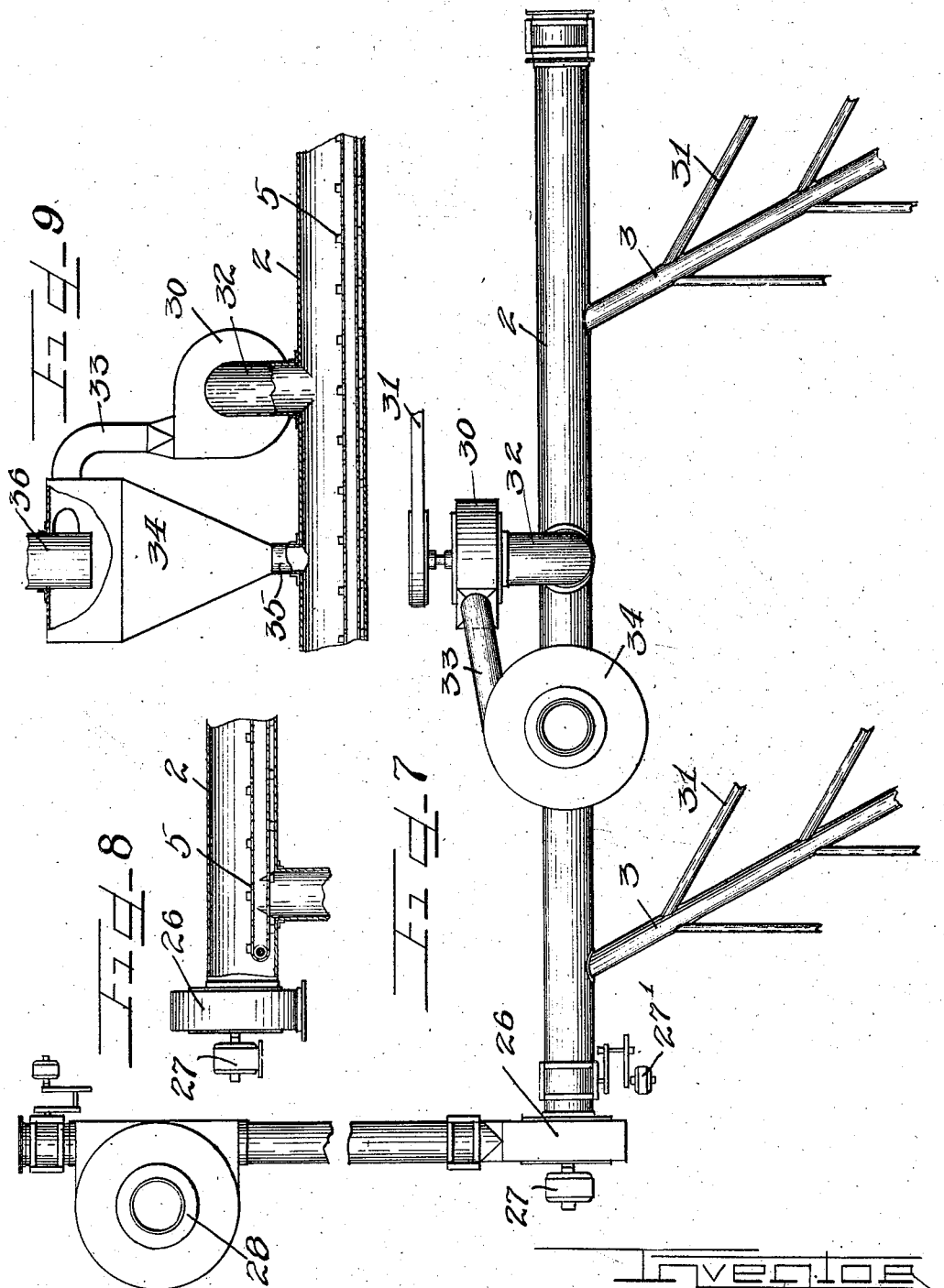

Patented Dec. 14, 1926.

1,610,358

UNITED STATES PATENT OFFICE.

RAYMOND E. CALLER, OF SCARSDALE, NEW YORK.

DUST-COLLECTING SYSTEM.

Application filed February 21, 1925. Serial No. 10,763.

This invention relates to conveying means designated as dust handling systems.

It will be explained as applied to a system for collecting miscellaneous materials including dust in wood working establishments, although applicable to many other uses.

"Miscellaneous materials", as that term is herein employed, includes the larger and heavier constituents of dry, factory-wastes, such, for example as sawdust, shavings, splinters, chunks and blocks ordinarily produced as a necessary by-product of wood-making machinery. "Dust" comprehends the smaller and lighter constituents, which ordinarily, may be more or less held in suspension in air.

Heretofore it has been the common practice to handle the miscellaneous materials and dust of dry factory-wastes in the same or a like manner by conveying them through pipes or ducts under the propelling force of air currents. The air alone has been depended upon to carry both the miscellaneous materials and the dust from the machines through branch pipes or ducts to relatively large trunks or main collecting pipes or conduits, and through the trunks to the final destination such as storage bins, furnace hoppers, etc. These systems may be termed "full air" systems.

Such systems are wasteful of power and necessitates careful proportioning of the trunk and branch pipes.

The proper conveying of the miscellaneous materials and dust through the constituent conduits of such a system depends primarily upon the maintenance of relatively high air velocities. Thus, the air velocity in the trunks must be sufficient to keep in continuous motion the aggregate of all of the material fed thereto by the branches. To maintain this velocity relatively great and quite constant, relatively large volumes of air must at all times be drawn through the trunks irrespective of the amount of material being conveyed therein. Consequently the power required to continuously operate the necessary fans or blowers is excessive in proportion to the effective work performed.

In the earlier systems to which reference has been made in order to obtain satisfactory results the branch pipes and trunks had to be so proportioned as to insure the proper air velocities in every part of the system. In other words the entire system of branches and trunks had to be properly balanced to maintain proper working conditions. Consequently any subsequent redistribution of the interrelated elements or service requirements of such a system would destroy the initial balance and cause serious trouble. For example, the relocation or addition of machines producing said miscellaneous materials in the factory, any rearrangement of branch or trunk pipes, or even shutting down of some such machines could bring about such unbalanced conditions that the system would become inefficient and subject to clogging. Sometimes it was necessary to rebuild the entire system in order to accommodate some seemingly slight rearrangement of factory processes.

One of the objects of this invention is to improve the means or systems for handling of miscellaneous materials and dust.

Another object is to overcome the objections incident to the present "full air" systems.

Another object is to dispense with exclusive air conveyance of miscellaneous materials in the trunks.

Another object is to provide a system which requires less power than the present "full air" systems to produce the same results.

Another object is to provide a system which possesses great flexibility in the matter of relocation and service accommodation of its constituent parts.

Another object is to provide a system wherein the air requirements of branches and trunks may be independently varied without affecting other constituent parts.

Another object is to provide a system which will readily accommodate growth, contraction and rearrangement of manufacturing units and processes.

Another object is to provide a system which is efficient and reliable in operation and incomplex to install and maintain.

Other objects and advantages will hereinafter appear.

An embodiment of the invention is illustrated in the accompanying drawings, in which Figure 1 is a top plan of a typical system.

Figure 2 is a side elevation thereof.

Figure 3 is an end elevation viewed from the right of Figure 1.

Figure 4 is an enlarged section on the line 4—4 of Figure 1.

Figure 5 is an enlarged view of a part of the main conveyor driving mechanism.

Figure 6 is an enlarged section on the line 6—6 of Figure 1.

Figure 7 is a view similar to Figure 1 showing a modification thereof.

Figure 8 is a vertical section of a part of the conveyor shown in Figure 7 showing parts in elevation, and Figure 9 is a view showing a vertical section of the conveyor of Figure 7 located intermediate the ends of the conduit, to assist in attenuating the air in said conduit.

The improved dust handling or conveying system, hereinafter described, comprehends and includes the use of air conveyance of miscellaneous materials and dust in the branches, and mechanical conveyance for the heavier materials in the trunk conduits or mains. Ordinarily air currents will be passed through the trunks or mains but only at sufficient velocity and of proper volume to insure discharge of material from the branch pipes into the trunks and to move the floating dust therethrough. After the waste or heavier miscellaneous material is discharged from the branch pipes into the main or trunk it is propelled therein, primarily, if not entirely, by a purely mechanical conveyor. In other words, the improved system employs both air and mechanical propulsion as distinguished from the usual "full air" propulsion or an entirely mechanical propulsion. Air propulsion is employed to discharge the load from the branch pipes into the corresponding trunk and then mechanical propulsion carries the load in the trunks to destination.

The air passing thru the trunk, resulting from exhausting the trunk and branches for the purpose of conveying the miscellaneous materials and the dust from the machines producing them to the trunk, passes through the trunk in which the mechanical conveyor therein is being moved and, therefore, this air agency may be utilized to move the lighter floating dust particles through the trunks, whereas the heavier particles which fall will be caught and carried along by said mechanical means.

The system chosen for the purpose of illustration and as shown has two trunks, or main conducting pipes, 1 and 2. Of course, the number and arrangement of the trunks may be varied to suit the conditions to be met in practice. To each trunk, branch pipes 3 and sub branch pipes 3' are connected. The trunks are of such size and location as to economically and conveniently accommodate the branches required. The branches and sub-branches may extend from individual machines or groups of machines to the trunk according to the desired layout of the plant equipment.

The branches and trunks are imperforate except for their inlet and discharge openings. Each branch and sub-branch collects the dust and miscellaneous material from its particular machine, or machines, by means of hoods of any approved type. This load of dust and heavier material so collected, is propelled along and within the branches to the trunk by the force of air currents in rear and attenuation of air in front of the load as in a full air system.

The trunks and branches may be formed into pipes or conduits from suitable material such as sheet iron or steel. The branches may be circular in cross-section, while the trunks are, preferably, of somewhat oval shape, as shown in Figure 4. The joints between the branches and trunks may be of any suitable substantially air tight variety. In order to facilitate the discharge of the contents of branches into the trunks it has been found to be good practice to have the branches intersect the trunks in the direction of movement of the load at about 45 degrees, as shown.

Each trunk is provided with a suitable mechanical conveyor of which the chain type is shown for moving the load therethrough. The chain conveyor may take the form of an endless chain or belt 5 provided at suitable intervals with drags 6. Adjacent one end of a trunk chain 5 passes around an idler sprocket wheel 7. Adjacent the opposite end of a trunk the chain passes around a driving sprocket wheel 8. Chain 5 and sprocket wheels 7 and 8 are located within the associated trunk duct.

Driving sprocket wheel 8 is carried by a shaft 9 which passes through the walls of a trunk and is journalled in suitable bearings supported by a framework 10. It is driven by a suitable source of power, such as an electric motor 11, through an appropriate speed-reduction train 12.

Drags 6, in the lower run of the chain, are in close proximity to the bottom wall of a trunk. Thus the grosser or heavier materials, which because of the sloping walls of the trunk are precipitated and collected in the bottom thereof, are readily carried along by the conveyor. The upper return flight of the chain being open and removed a considerable distance above the bottom of the trunk duct offers little resistance to the settling of the material and does not move the material in a reverse direction to any appreciable extent. A trunk cross-section such as shown in Figure 4 affords an exceptionally good form for efficient reception and conveyance of the materials.

The mechanical conveyor in the trunk 2 is shown to be driven by the electric motor 11, through pulley 19, belt 20, pulleys 21 and 22, belt 23 and pulley 24. The mechanical conveyor in trunk 1 is driven by motor 25 through a similar speed reducing gear.

Any other suitable source of power may, of course, be used for driving the conveyors.

An exhaust fan 26 is driven by an electric motor 27. This fan exhausts the trunks 1 and 2 and the connecting branches 3—3' and collects the floating dust and discharges it into the usual cyclone dust collector 28 through duct 29.

The heavier miscellaneous materials carried through the trunks 1 and 2 by the mechanical conveyors, may be made to fall from the trunks into a suitable air trapped boot at their ultimate destination or they may be carried through the cyclone 28 and discharged therefrom.

In Figure 7 there is shown a trunk or conduit 2 having a plurality of branches 3 and sub-branches 3' and in this conduit the conveyor 5 is shown. This or other forms of mechanical conveyors may be used for some purposes in connection with this system when desired. Any sort of mechanical conveyor is within contemplation of the invention.

In Figure 7 there is shown an auxiliary fan 30 driven by a belt 31 and having its eye or intake opening connected to trunk 2 by pipe 32. The discharge opening of the fan 30 is connected by pipe 33 to the cyclone dust separator 34. The dust discharge end 35, of the cyclone, is connected to the trunk 2. Air taken from trunk 2 by the fan 30 passes out of the tubular guard 36 at the upper end of the cyclone and the dust taken from the trunk 2, by the fan, is returned thereto by the cyclone 34 through its discharge opening 35. By this means auxiliary fan 30 is made to supplement the operation of fan 26 in attenuating the air in the trunk and branches to assist in causing movement of air through the pipe.

As many intermediate fans 30 and cyclones 34 may be used at intervals in the trunk to attenuate the air uniformly therein tending to the creation of a vacuum to accelerate movement of the material through the ducts and dust through the trunks, as the installation may require. The auxiliary fan 30 will not lift the heavier material from the trunk. It takes only the lighter dust and air from the trunk and the cyclone retains the dust and permits it to return to the trunk and releases the air taken out of the trunk by the fan.

The air currents through the trunks may be made to move in a direction opposite to the direction of travel of the mechanical conveyor, and discharged at a different point from that where the heavier materials are caused to leave the trunk.

In the claims I have used the word "dust" to include the lighter and the heavier dry miscellaneous materials, except where a distinction is made, and I have used the term "dust handling system" to conform with the classification or nomenclature adopted by the Patent Office.

I am aware that many changes may be made and numerous details of construction may be varied through a wide range without departing from the principles of this invention, and I therefore do not purpose limiting the patent granted hereon, otherwise than necessitated by the prior act.

Having described my invention what I claim as new and desire to secure by Letters Patent, is:—

1. A dust handling system for conveying material heavier than air and lighter particles thereof, which includes a main trunk line and a plurality of smaller branch ducts connected thereto, means to exhaust said trunk line and said ducts of air to produce sufficient velocity to move both materials through said ducts only, and a mechanical conveyor to move the heavier material through the trunk line only.

2. A dust handling system for conveying material heavier than air and lighter particles thereof, which includes a main trunk line and a plurality of smaller branch receiving ducts connected thereto, means to cause air to pass through the trunk and ducts at a higher velocity through the latter to convey material through the ducts to the trunk, and a drag conveyor in said trunk to convey material therethrough.

3. A dust handling system for conveying material heavier than air and air floating particles thereof, which includes a main trunk line and a plurality of smaller branch receiving ducts connected thereto, the combined cross section area of the ducts being less than the cross section area of the trunk, means to exhaust air from the trunk and ducts to produce sufficient velocity in the ducts to move said material through them to the trunk and having insufficient velocity in the trunk to move said material therethrough, and a drag conveyor in the trunk to convey the heavier material therethrough.

4. A dust handling system for conveying material heavier than air and air floating particles, which includes a trunk line pipe of uniform diametric area having a flat bottom wall part and a rounding upper wall part, a drag conveyor therein having drags movable along said flat part, means to move the conveyor to convey material through said pipe, branch ducts connected to said pipe having combined sectional area less than that of the trunk, and means to partially exhaust said pipe and ducts of air to move material through the ducts by air pressure and through the trunk by mechanical means.

5. A dust handling system comprising an air conduit trunk line; a mechanically operable conveyor therein; branch air conduits communicating with the trunk line and a plurality of means to produce partial vacuum in the trunk line and branches, located at intervals in the trunk line.

6. A dust handling system comprising an air conduit trunk line having branches connected thereto; a mechanical conveyor in said trunk line to move the heavier material therethrough; means to substantially exhaust the trunk line and branches; auxiliary means to take air and dust from said trunk line and branches and means to permit said air to escape and to return said dust to said trunk.

7. A dust handling system comprising an air conduit; means to move dust laden air therethru located near one end of the conduit and other means to extract air and dust from said conduit and to exhaust the air and to return the dust to said conduit.

8. A dust handling system comprising a trunk line conduit and branches connected thereto, air moving means to cause dust to pass thru said trunk line and dust and heavier materials to pass thru said branches; mechanical means to cause the heavier materials to pass thru said trunk and means to take air and dust from said trunk and to return the dust thereto.

In testimony whereof I have hereunto subscribed my name.

RAYMOND E. CALLER.